United States Patent [19]

Lundberg

[11] 4,245,899
[45] Jan. 20, 1981

[54] SLIDE MAGAZINE FOR SLIDE PROJECTORS

[75] Inventor: Jan A. Lundberg, Torslanda, Sweden

[73] Assignee: Victor Hasselblad AB, Göteborg, Sweden

[21] Appl. No.: 15,044

[22] Filed: Feb. 26, 1979

[51] Int. Cl.³ .................. G03B 23/06; B65D 85/48
[52] U.S. Cl. .................................. 353/117; 206/456
[58] Field of Search ............... 353/107, 117; 206/456

[56] References Cited

U.S. PATENT DOCUMENTS

| 3,469,910 | 9/1969 | Badalich | 353/117 |
| 3,781,103 | 12/1973 | DiPietro | 353/117 |
| 3,994,578 | 11/1976 | Barowski | 353/117 |

Primary Examiner—Steven L. Stephan
Attorney, Agent, or Firm—Sherman & Shalloway

[57] ABSTRACT

A circular horizontal slide magazine intended for use with a film slide projector of the type in which sequential slides are released down into a position of preparedness, and then to a projection position, with the previous slide being returned to the magazine. This invention obviates the necessity of the magazine having one slide compartment which must be left empty by providing a manually operated locking mechanism which operates to prevent all of the slides from being released from the magazine.

13 Claims, 8 Drawing Figures

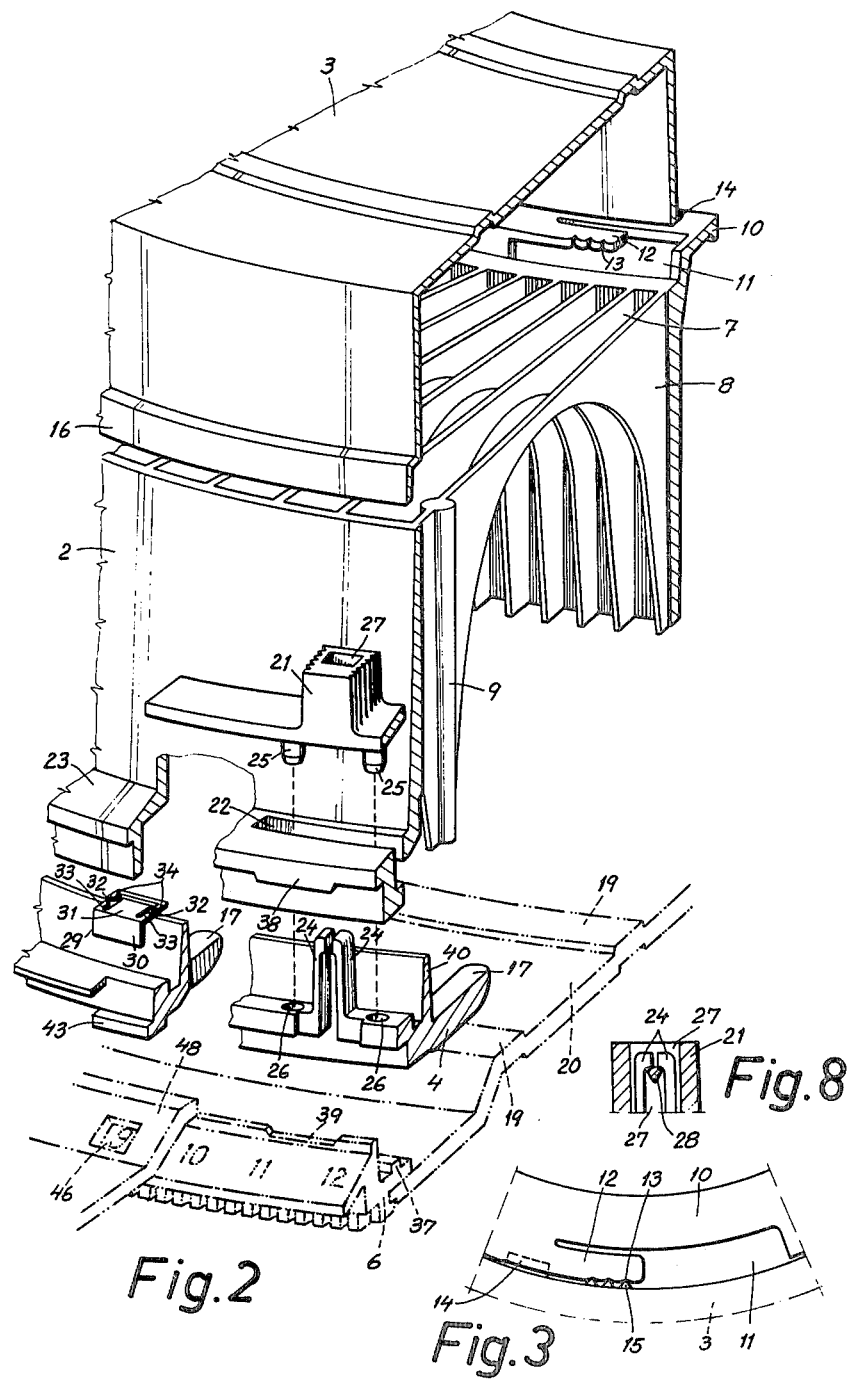

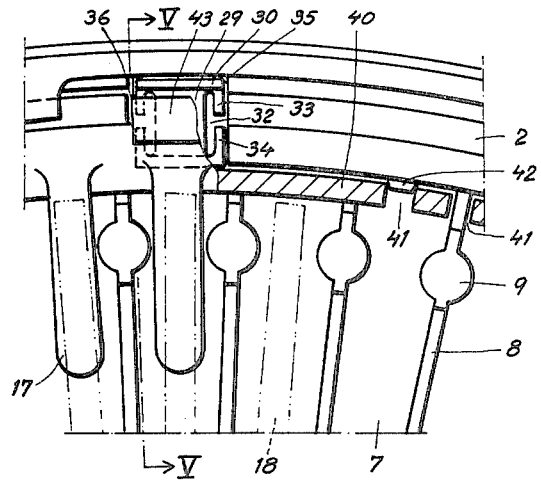
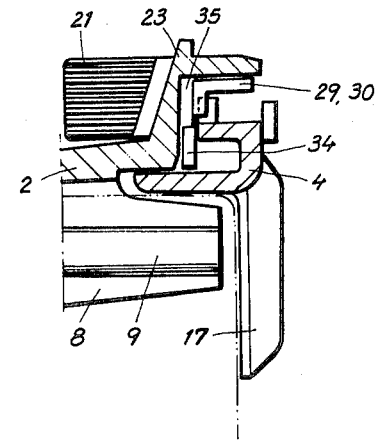
Fig.4  Fig.5
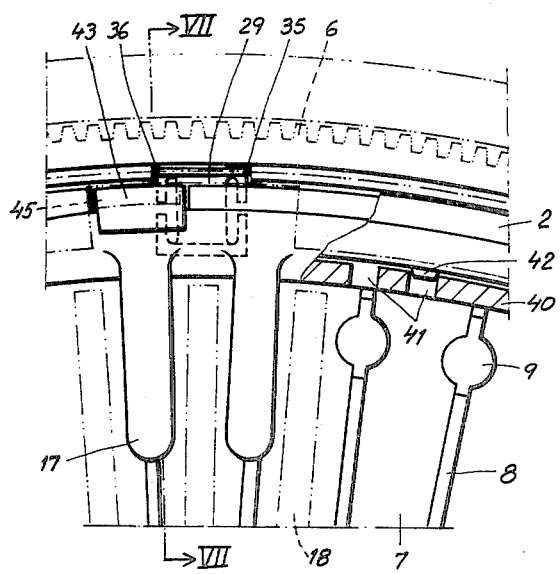
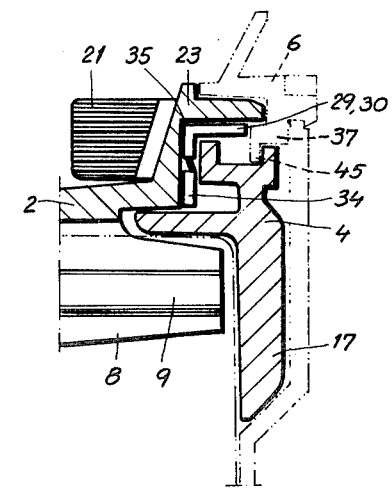
Fig.6  Fig.7

SLIDE MAGAZINE FOR SLIDE PROJECTORS

BACKGROUND OF THE INVENTION

1. Field of the Invention

This invention relates to slide projectors provided with interchangeable, horizontally disposed circular slide magazines comprising radial compartments for slides mounted in frames. The slide magazine is intended for use together with a slide projector, which is provided with a permanent driver ring with gear rim for rotating the slide magazine and with an upper plate adapted to directly support upright slide frames transported to and from the slide holder of the projector through slide aperture arranged in the upper plate and provided with releasable lockers.

2. Description of the Prior Art

Slide magazines of the kind here concerned and intended for horizontal operating position are known previously in several different embodiments. Such circular slide magazines are provided with a magazine bottom to prevent the slide frames from falling down out of their radially arranged compartments and remain standing on the upper plate of the slide projector. In the magazine bottom a locked aperture is provided for the transport of the slide frames to and from the slide holder of the slide projector through an opening in the upper plate of the projector. Known circular slide magazines, besides, are provided with a stationary gear rim for rotating the slide magazine at slide change. It is further known to provide circular slide magazines with a detachable cover, so that the slide magazine also can serve as a dust-proof storage box for the slide frames.

The slide compartment located directly above said aperture in the magazine bottom cannot be used, unless a special arrangement is made. Such a magazine, therefore, holds one slide less than it theoretically could hold. The empty slide compartment, besides, causes a disturbing interruption when the slide projector is used for showing a continuous slide program. For eliminating these inconveniences, it is known to provide directly above the bottom plate a cover plate of circle segment shape, which is controlled by a spring and automatically closes the aperture in the bottom plate when the slide magazine is lifted off the slide projector. A further advantage of this design is the simplified manufacture of the plastic body of the slide magazine due to the mutually equal slide compartments.

The slide magazines, are provided with simple detachable covers and, where appropriate, with bottoms, are suitable storage boxes for slide frames. Usually, therefore, a plurality of slide magazines per slide projector are sold, thereby rendering it possible in a simple and comfortable manner to store completely edited slide programs. It is, therefore, of interest that the slide magazines are simple as to their design and use and that they are also inexpensive.

Circular horizontal slide magazines according to the present invention are intended for a film slide projector, on the upper plate of which a driver ring with gear rim to be coupled to the slide magazine and provided for rotating the slide magazine. The upper plate further is capable of directly supporting upright slide frames, which are transported to and from slide holders of the slide projector through a slide opening with releasable catch provided in the upper plate.

SUMMARY OF THE INVENTION

The present invention has the object to provide for a slide projector of the aforesaid kind a simple and cheap slide magazine, which comprises radial, symmetrically arranged, downwardly open compartments for slide frames, where the compartments at the removal and mounting of the slide magazine on the slide projector are locked by a means, which permits removal and mounting of the slide magazine only when the means is locked, but which can be released when the slide magazine is mounted on the slide projector. A further object of the present invention is to provide the slide magazine with a cover and bottom, which are to be used when the slide magazine serves as storage box for slide frames.

BRIEF DESCRIPTION OF THE DRAWINGS

The invention is described in the following, with reference to the accompanying drawings showing a preferred embodiment of a slide magazine according to the invention.

FIG. 2 is a vertical perspective cross-section showing the slide magazine portion according to FIG. 1 which comprises the control means of the slide magazine.

FIG. 3 is a horizontal view from above of a detail of the upper cover of the slide magazine.

FIG. 4 is a horizontal view from below of the blocking and locking mechanism of the slide magazine in locked position.

FIG. 5 is a vertical section V—V through the mechanism shown in FIG. 4.

FIG. 6 is a horizontal view corresponding to FIG. 4, but with the mechanism in unloced position.

FIG. 7 is a vertical section VII—VII through the mechanism shown in FIG. 6.

FIG. 8 is a vertical section through one of the jointing members of the slide magazine.

DETAILED DESCRIPTION OF THE INVENTION

Figure 1:
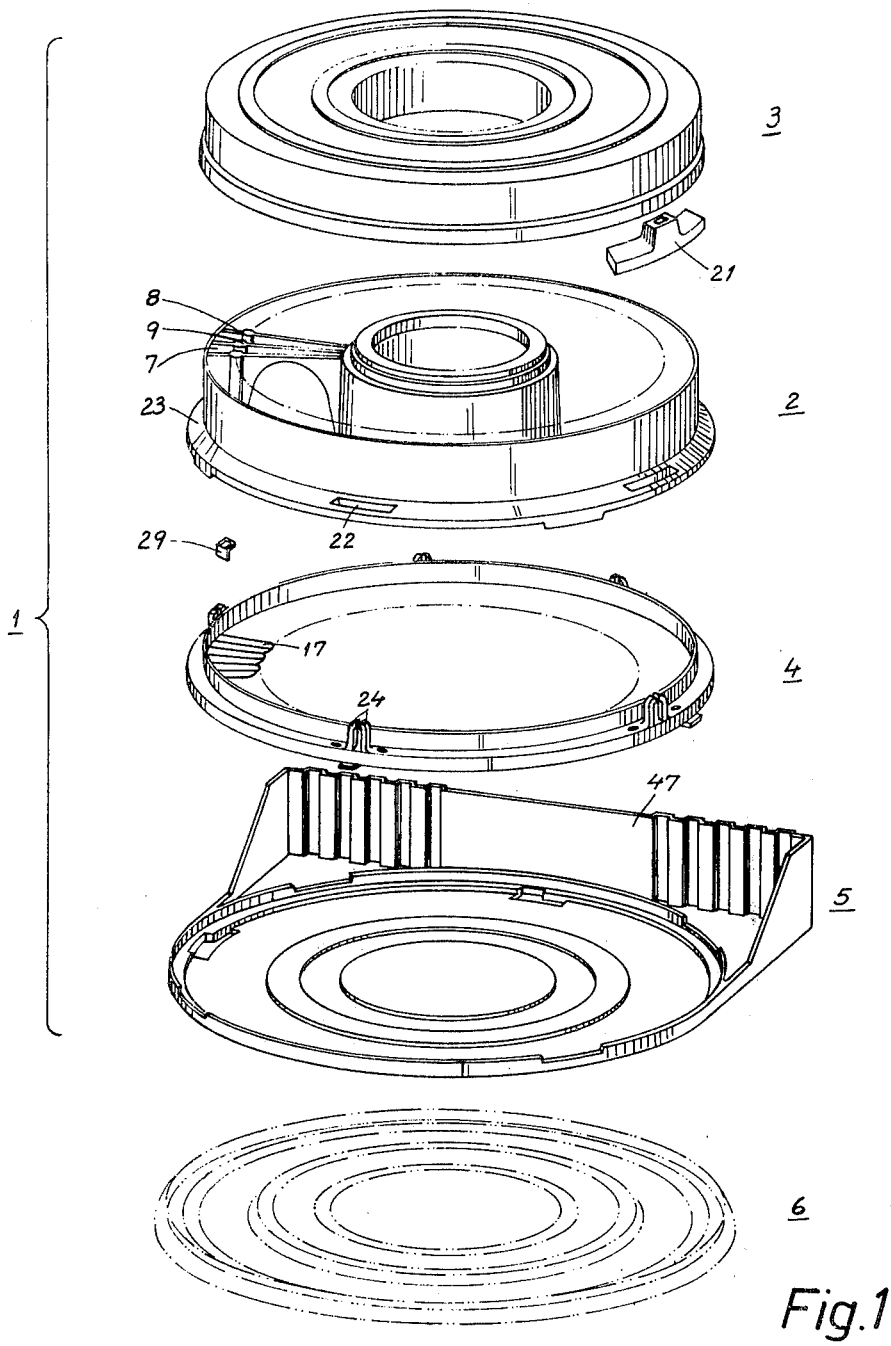
FIG. 1 is a simplified perspective exploded view of a slide magazine according to the invention and of a connecting slide projector portion.

A slide magazine 1 according to the invention shown in FIG. 1 is assembled of several parts, which preferably are made of injection-molded plastic. The central portion of the slide magazine 1 is a ring-shaped magazine body 2, which upwardly is provided with a removable cover 3 of transparent plastic and downwardly is coupled together with a rotatable locking ring 4 of such a design, that it can be connected to the driver ring B (FIGS. 1 and 2) of a projector. The slide magazine 1 further comprises a plurality of locking ring buttons 21 for rotating the locking ring 4 and a safety catch 29 for preventing unintentional rotation of the locking ring 4. A supporting disc 5 is connected to the locking ring 4 in the same way as the driver ring 6 and constitutes a lower cover of the slide magazine 1 when this is used as storage space for slide frames.

The magazine body 2 is divided by radially arranged partition walls 8 into a plurality of mutually equal slide compartments 7, which are open upwardly and downwardly. In order to provide the sector-shaped slide compartments 7 with constant width for slide frames 18 stored therein (FIGS. 4 and 6), the partition walls 8 are provided with vertical distance strips 9 (FIGS. 1, 2, 4 and 6). The magazine body 2 is upwardly formed so as to enable a detachable, dust-proof mounting of the cover 3, in such a manner, that the magazine body 2 and the cover 3 are coupled together by a bayonet catch. The bayonet catch half located on the magazine body 2 consists of an upper central support flange 10 for the cover 3 (FIGS. 2 and 3), in which a number, for example four, of recesses 11 are provided, into which resilient tongues 12 with flat indentations 13 project. The other half of the bayonet catch is located on the central portion of the cover 3 and consists of horizontal locking bosses 14 corresponding to the recesses 11 and of studs 15 (FIG. 3) corresponding to the indentations 13. The outer edge of the cover 3 facing toward the magazine body 2 is formed as a fold-over 16 (FIG. 2). When the cover 3 is being mounted (FIG. 3), the locking bosses 14 are fitted into the recesses 11, whereafter the cover 3 is rotated through about 20° in clockwise direction, whereby the locking bosses 14 are inserted beneath the tongues 12 and at the same time the indentations 13 and studs 15 act as a snap lock. For removing the cover 3, it is rotated through about 20° in counterclockwise direction and lifted off. The cover 3 only need be removed when the slide frames 18 are to be inserted or removed (FIGS. 4 and 6), because the slides are changed at projection through the lower side of the slide magazine 1.

The lower peripheral portion of the magazine body 2 is formed as an inclined folded-over flange 23, which encloses the periphery of the locking ring 4 so that the locking ring 4 is supported rotatably in the magazine body 2. The flange 23 is provided with a plurality of grooves 22, for example five, for coupling together the magazine body 2 and the locking ring 4 (FIGS. 1 and 2). On the locking ring 4 locking snappers 24 are provided in pairs, which project upward through the grooves 22 into holes 27 in the locking ring buttons 21. In said holes 27 a locking bar 28 is located, which upon the mounting of the locking ring buttons 21 forces apart the free hook-shaped ends of the locking snappers 24 so that these ends snap in over the locking bar 28 when the locking ring button is fully depressed (FIG. 8). Two pins 25 disposed on the lower side of the locking ring button 21 project downward through the groove 21 and into guide holes 26 in the locking ring 4. The magazine body 2 and the locking ring 4 thereby are accurately fixed relative to one another, and the locking ring 4 can be rotated by means of one of the locking ring buttons 21 between two end positions defined by the length of the groove 22. In order to prevent play and to mark both end positions of the movement, two vertical grooves 41 are provided in the flange 40 of the locking ring 4 to co-operate with a protrusion 42 on the magazine body 2 (FIGS. 4 and 6). The distance between the end positions is so adjusted that associated angles of rotation correspond to one and a half slide compartment division (FIG. 2). The locking ring 4 is provided with one finger 17 for every slide compartment, which fingers 17 are directed radially inward beneath the slide compartments 7 (FIGS. 1 and 2). When the locking ring 4 is in one of the two end positions (FIGS. 4 and 5), the fingers 7 are located straight beneath the respective slide compartment 7, and the slide frames 18 stored in said compartments are locked and cannot drop out when the slide magazine 1 is positioned on or removed from the projector. In the other end position (FIGS. 6 and 7) of the ring 4 the fingers 17 are located straight beneath the partition walls 8, and the slide frames 18 are unlocked and can freely pass between the fingers 17.

In order to prevent unintentional rotation of the locking ring 4 from locked to released position when the slide magazine 1 is being handled, the safety catch 29 is arranged so that rotation can take place only when the slide magazine is mounted on the driver ring 6 of the projector (FIGS. 2 and 4-7). The safety catch 29 (FIG. 2) is made of resilient plastic and of L-shape, one angular leg 30 directed vertically downward and a second angular leg 31 directed horizontally inward when the slide magazine 1 is in horizontal position. The angular leg 31 is relatively thin in its central portion and has T-shaped recesses in its sides. Said recesses 32 form inner projections 33 and outer projections 34, respectively, along the edges of the angular leg 31. The projections 33, 34 have a greater thickness than the thin central portion of the angular leg 31, the inner projections 33 being located lower and the outer projections 34 being located higher than said central portion. The safety catch 29 is located in a depression 35 in the lower edge of the magazine body (FIGS. 4-7).

When the slide magazine 1 is removed from the slide projector, and the locking ring 4 is in a locked position (FIGS. 4 and 5), the safety catch 29 is relieved and, thus, not deformed by spring action. Hereby the inner projections 33 on the safety catch 29 are located lower than the plane on the magazine body 2 against which the locking ring 4 is axially supported. The projections 33 project downward into a recess 36 provided in the periphery of the locking ring 4 and corresponding to the safety catch 29, whereby the locking ring 4 is secured in the locked position as intended.

When the slide magazine 1 in the manner described below is being mounted on the slide projector, a shoulder 37 on the driver ring 6 presses the angular leg 30 of the safety catch 29 upward, whereby the thin central portion of the angular leg 31 springs aside. Thereby the inner projections 33 are released from the recess 36 (FIG. 7), and the locking ring 4 can be rotated between the locked and an unlocked position as described above.

The slide magazine 1 can be mounted on the driver ring 6 in one single angular position. This has been achieved by a number of projections 38, for example five, arranged with non-uniform division, alternatively with different lengths, on the magazine body 2 and by depressions 39 in the driver ring 6 corresponding to said projections 38. The mounting is facilitated thereby that the driver ring 6 and the magazine body 2 are provided with indices (not shown), for example red markings, which are fitted to each other.

In order to prevent the slide magazine 1 with the locking ring 4 in the unlocked position, from being lifted off from the slide projector, which would imply that the slide frames 18 drop out of the slide compartments 7, the locking ring 4 and the drive ring 6 are so coupled together, that such lifting cannot occur. On the locking ring 4 a number of projections 43, for example four, are provided (FIGS. 2, 4 and 6) which fit into corresponding recesses 44 in the driver ring 6 when the driver ring 4 is in locked position. When the locking ring 4 then is rotated to unlocked position, the projections 43 move inward beneath a flange 45 on the driver ring 6 and thereby render removal of the slide magazine 1 from the slide projector impossible. At the same time, the fingers 17 are moved inward beneath the partition walls 8, and the slide frames 18 can be exchanged through an aperture (not shown) located in the upper plate 20 of the slide projector and provided with catches. When the slide magazine 1 is in the driver ring 6, two sliding strips 19 on the upper plate 20 lift the slide frames 18 a short distance above the fingers 17, and the locking ring 4 unobjectedly can be rotated between the locked and unlocked position by one of the locking ring buttons 21 (FIG. 2).

The location of the slide magazine 1 on the driver ring 8 as described above has the object to facilitate the drafting and showing of a slide program. The slide compartments 7 are numbered by consecutive numbers, for example from 1 to 80. Corresponding numbers are arranged on the inclined outer edge of the driver ring 6, FIG. 2, which edge is hidden below a hood 48, in which a window 46 shows the number of the slide being shown.

When the slide magazine 1 is used as a storage space for the slide frames 18, the supporting disc 5 acts as a lower dust-proof cover. The support disc 5 (FIG. 2) is connected to the locking ring 4 in the same manner as described above with reference to the coupling-together of the locking ring 4 with the driver ring 6 on the slide projector. The details on the support disc 5 which are concerned with the coupling-together, therefore, are designed identical with above described corresponding details on the driver ring 6.

The preferred embodiment of the support disc 5 shown in FIG. 1 comprises a support plane 47 extending perpendicularly to the connecting plane of the support disc 5. Said support plane 47 renders it possible to place the slide magazine 1 on edge, for example on a shelf, when the magazine is intended to be used as storage space for slide frames. Alternatively the support plane 47 can be abandoned, in which case the support disc is designed as a circular cover (not shown). In this latter case the slide magazine 1 can be stored only in lying position.

I claim:

1. A circular slide magazine for slide projectors with vertical slide exchange having mutually equally spaced radial slide compartments for slides mounted in slide frames, and adapted to alternately mount onto a driver ring on the projector or a support disc, said magazine cmprising:
    (a) a magazine body (2), said body comprising open slide compartments (7) defined by a plurality of partition walls (8);
    (b) a locking ring (4) rotatably supported in the magazine body rotatable between locked and unlocked positions, said locking ring having retaining means for retaining a slide in each of the compartments when the locking ring (4) is in said locked position and the retaining means allowing movement of the slides into and out of the compartments when the locking ring (4) is in said unlocked position; and
    (c) a safety catch (29) for selectively prohibiting rotation between said body and said locking ring, said locking ring (4) including means for alternately latching onto either the driver ring (6) or the support disc (5) only when the locking ring (4) is in said locked position.

2. The slide magazine according to claim 1 further comprising:
    (a) a flange (23) in the magazine body (2) having at least one groove (22) therein;
    (b) at least one guide hole (26) in the locking ring (4);
    (c) at least one locking ring button (21) having at least one pin (25) therein, the locking ring button (21) being adapted to be connected to the locking ring (4) by means of the pin (25);
    (d) at least one hole (27) in the locking ring buttons (21), wherein the locking ring (4) is rotably connected to the magazine body (2) by means of the pin (25) projecting through the groove (22) to the guide hole (26).

3. A slide mechanism according to claims 1 or 2 further comprising:
    (a) a flange (40) on the locking ring (4);
    (b) at least one vertical groove (41) in the flange (40);
    (c) a protrusion (42) on the magazine body (2) cooperating with the groove (41), the locking ring (4) being lockable by snapping action to the magazine body (2) by means of the protrusion (42) cooperating with the groove (41).

4. The slide magazine according to claim 3 wherein the magazine body (2) has at least two projections (38) and the driver ring (6) have depressions (39) corresponding to the projections (38) for mounting the slide magazine (1) on the driver ring (6) in a pre-determined angular position relative to each other.

5. A slide magazine of claims 1 or 2 further comprising:
    (a) a recess (36) in the locking ring (4);
    (b) a depression (35) in the lower edge of the magazine body (2);
    (c) a safety catch (29) consisting of a pair legs angularly disposed to one another, wherein the safety catch (29) is located in the depression (35) for cooperation with the recess (36), the locking ring (4) being rotable when the safety catch (29) is resiliently deformed by a stop member (37) located on the driver ring (6) and the locking ring (4) is locked in its locked position by means of the safety catch (29) when the safety catch (29) is not deformed by the stop member on the driving ring.

6. The slide magazine according to claims 1 or 2 wherein the magazine body (2) has at least two projections (38) and the driver ring (6) have depressions (39) corresponding to the projections (38) for mounting the slide magazine (1) on the driver ring (6) in a pre-determined angular position relative to each other.

7. The slide magazine according to claims 1 or 2 wherein the upper side of the magazine body is provided with:
    (a) a detachable cover (3) having an over-fold (16) to enclose the outer edge of the magazine body (2);
    (b) an upper central support flange (10) on the magazine body (2); and locking means consisting of resilient tongues engaging locking bosses for selectively engaging the detachable cover (3) to the upper central support flange (10).

8. The slide magazine according to claims 1 or 2 wherein the means for selectively retaining the slides is comprised of radially inwardly directed fingers (17) projecting from the locking ring (4) whereby, when the locking ring is in the unlocked position, the fingers are located beneath the slide compartments (7) and, when the slide magazine (1) is mounted on the driver ring (6) of the slide projector, the locking ring may be rotated to the unlocked position so that the fingers are beneath the partition walls (8) and the slide compartments are open.

9. The slide magazine according to claim 8 wherein said locking ring (4) has at least two projections (43) and adapted to fit into corresponding recesses (44) provided in the driver ring (6) and support disc (5), respectively, and said projections are located directly in front of the recesses (44) when the locking ring (4) is in the locked position, and located beneath a flange (45) on the driver ring (6) and support disc (5), respectively, when the locking ring (4) is in unlocked position, so that the slide magazine (1) can be removed from and mounted on the driver ring (6) and support disc (5), respectively, only when the slide compartments (7) are locked by the fingers (17).

10. A circular slide magazine for use with slide projectors with vertical slide exchange and a magazine driver ring comprising:
  (a) a magazine body, said body comprising axially open slide compartments defined by partition walls for slide frames;
  (b) a locking ring rotatably located in the magazine body between locked and unlocked positions, said locking ring having retaining means for retaining all of the slides in the compartments when the locking ring is in said locked position and the retaining means allowing movement of the slides into and out of the compartments when the locking ring is in said unlocked position;
  (c) a safety catch for selectively prohibiting rotation between said body and said locking ring, said locking ring adapted to be coupled together with and detached from a driving ring of an associated projector when the locking ring is in a locked position; and
  (d) a support disc adapted to be coupled together with and detachable from said locking ring, when the locking ring is in a locked position, the support disc being detached when said slide tray is mounted on said slide projector.

11. The slide magazine of claim 10 further comprising:
  (a) a detachable cover having an extension thereon to cover the outer edge of the magazine body;
  (b) an upper central support means extending from the magazine body;
  (c) first and second cooperating locking means, the first locking means fixed to the detachable cover and the second locking means fixed to the upper central support means, wherein the first and central cooperating locking means cooperate with one another to selectively engate and disengage the detachable cover from the magazine body.

12. The slide magazine according to claim 10 wherein said locking ring has at least two projections and the driver ring and support disc, respectively, are provided with corresponding recesses, and said projections are located directly in front of the recesses when the locking ring is in the locked position, and located beneath a flange on the driver ring and support disc, respectively, when the locking ring is in unlocked position, so that the slide magazine can be removed from and, respectively, mounted on the driver ring and support disc, respectively, only when the slide compartments are locked by the fingers.

13. The slide mechanism according to claim 10 wherein a support plane perpendicular to the plane of the support disc is provided whereby the slide magazine may be supported for storage with the plane of the support disc in a vertical position.

* * * * *

UNITED STATES PATENT AND TRADEMARK OFFICE
CERTIFICATE OF CORRECTION

PATENT NO. : 4,245,899
DATED : January 20, 1981
INVENTOR(S) : Jan A. Lundberg

It is certified that error appears in the above—identified patent and that said Letters Patent is hereby corrected as shown below:

Please add Item "[30] Foreign Application Priority Data"

--Swedish Application 7806897 filed June 15, 1978.--

Signed and Sealed this

Seventh Day of July 1981

[SEAL]

Attest:

RENE D. TEGTMEYER

*Attesting Officer*  *Acting Commissioner of Patents and Trademarks*